US011568210B2

(12) United States Patent
Gaidon et al.

(10) Patent No.: US 11,568,210 B2
(45) Date of Patent: Jan. 31, 2023

(54) NEURAL ARCHITECTURE SEARCH FOR FUSING MULTIPLE NETWORKS INTO ONE

(71) Applicant: TOYOTA RESEARCH INSTITUTE, INC., Los Altos, CA (US)

(72) Inventors: Adrien David Gaidon, Mountain View, CA (US); Jie Li, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 466 days.

(21) Appl. No.: 16/853,181

(22) Filed: Apr. 20, 2020

(65) Prior Publication Data

US 2021/0326676 A1    Oct. 21, 2021

(51) Int. Cl.
*G06N 3/04* (2006.01)
*G06F 17/18* (2006.01)
*G06K 9/62* (2022.01)

(52) U.S. Cl.
CPC .......... *G06N 3/0454* (2013.01); *G06F 17/18* (2013.01); *G06K 9/623* (2013.01); *G06K 9/6288* (2013.01); *G06K 9/6296* (2013.01)

(58) Field of Classification Search
CPC .... G06N 3/0454; G06F 17/18; G06K 9/6288; G06K 9/6296
See application file for complete search history.

(56) References Cited

U.S. PATENT DOCUMENTS

| 2020/0293899 | A1* | 9/2020 | Fernando | G06N 3/0454 |
| 2021/0158142 | A1* | 5/2021 | Luo | G06N 3/08 |
| 2022/0067482 | A1* | 3/2022 | Bariamis | G06N 3/08 |

OTHER PUBLICATIONS

Balazs, Gabor, and Walter Stechele. "Neural Architecture Search for Automotive Grid Fusion Networks Under Embedded Hardware Constraints." 2020 19th IEEE International Conference on Machine Learning and Applications (ICMLA). IEEE, 2020. (Year: 2020).*
Peng, Yige, et al. "Multi-modality information fusion for radiomics-based neural architecture search." International Conference on Medical Image Computing and Computer-Assisted Intervention. Springer, Cham, 2020. (Year: 2020).*
Cheng, Xuelian, et al. "Hierarchical neural architecture search for deep stereo matching." Advances in Neural Information Processing Systems 33 (2020): 22158-22169. (Year: 2020).*

(Continued)

*Primary Examiner* — Fayyaz Alam
(74) *Attorney, Agent, or Firm* — Sheppard, Mullin, Richter & Hampton LLP; Hector A. Agdeppa; Daniel N. Yannuzzi

(57) ABSTRACT

One or more embodiments of the present disclosure include systems and methods that use neural architecture fusion to learn how to combine multiple separate pre-trained networks by fusing their architectures into a single network for better computational efficiency and higher accuracy. For example, a computer implemented method of the disclosure includes obtaining multiple trained networks. Each of the trained networks may be associated with a respective task and has a respective architecture. The method further includes generating a directed acyclic graph that represents at least a partial union of the architectures of the trained networks. The method additionally includes defining a joint objective for the directed acyclic graph that combines a performance term and a distillation term. The method also includes optimizing the joint objective over the directed acyclic graph.

16 Claims, 6 Drawing Sheets

(56) References Cited

OTHER PUBLICATIONS

U.S. Food & Drug Administration letter re: Designation Request #RPD-2019-267 to R.J. Thompson, MD, Granting AST-120 for treatment of urea cycle disorders, McCune & Maynard.
Xie et al., SNAS: stochastic neural architecture search. In International Conference on Learning Representations, 2019, pp. 1-17.
Wu et al., "FBNet: Hardware-Aware Efficient ConvNet Design via Differentiable Neural Architecture Search", The IEEE Conference on Computer Vision and Pattern Recognition (CVPR), 2019, pp. 10734-10742.
Pasunuru et al., "Continual and Multi-Task Architecture Search", Computation and Language (cs.CL); Computer Vision and Pattern Recognition (cs.CV); Machine Learning (cs.LG), Submitted on Jun. 12, 2019, 12 pages.
Liu et al., Darts: Differentiable architecture search. arXiv preprint arXiv:1806.09055, 2018c, Machine Learning (cs.LG); Computation and Language (cs.CL); Computer Vision and Pattern Recognition (cs.CV); Machine Learning (stat.ML), Published as a conference paper at ICLR 2019, Submitted on Jun. 24, 2018, last revised Apr. 23, 2019.
Elsken et al., Neural architecture search: A survey. arXiv preprint arXiv:1808.05377, 2018b, Journal of Machine Learning Research 20 (2019) pp. 1-21, Submitted 9/18; Revised 3/19; Published 3/19.
Ahmad et al., "Improving Along Z Range Prediction for Nonlinear Process Modeling through Combining Multiple Neural Networks", DOI: 10.1109/CCA.2002.1038733, Source: IEEE Xplore: Dec. 10, 2002, Print ISBN: 0-7803-7386-3, Published in: Proceedings of the International Conference on Control Applications, Sep. 18-20, 2020, vol. 2, Glasgow, U.K., 6 pages.
BOSOI: AST-120 (Spherical carbon absorbent) lowers ammonia levels and attenuates brain edema in bile-duct ligated rats. www.pubmed.gov/21384402 (Abstract).
BUTTERWORTH: Experimental models of hepatic encephalopathy: ISHEN guideleines. www.pubmed.gov/19638106 (Abstract).
JOVER: Brain edema and inflammatory activation in bile duct ligated rats with diet-induced hyperammonia: a model of hepatic encephalopathy in cirrhosis. www.pubmed.gov/16729306.
En-TONG: Telmisartan attenuates hepatic fibrosis in bile duct-ligated rats. www.pubmed.gov/23103625 (Abstract).

\* cited by examiner

NEURAL ARCHITECTURE SEARCH FOR FUSING MULTIPLE NETWORKS INTO ONE

TECHNICAL FIELD

The present disclosure relates generally to machine learning, and in particular, some implementations may relate to neural architecture searches that fuse multiple networks into a single network.

DESCRIPTION OF RELATED ART

Neural networks can be formed from a set of algorithms modeled loosely after the human brain. Generally, a neural network is a mathematical object that comprises a set of nodes and Directed Acyclic Graphs ("DAGs") that link those nodes with a relation that is directional (e.g., inputs and outputs). A DAG is a finite directed graph with no directed cycles, consisting of a finite number of vertices and edges with each edge directed from one vertex to another. Typical neural networks may input, for example, an image and feed the image into a single node or layer (e.g., a convolutional layer with some convolutional fields/weights) that processes the image and outputs an activation map or features. The output then becomes the input of another layer of the network (e.g., another convolutional or other type of layer).

Neural networks may be designed by hand based on human intuition and limited experimental evidence. For example, the designer would form the network architecture or characteristics of the DAG, pick the weights of the nodes in the network, and arrange the connectivity of the nodes (e.g., into a chain of layers/operations in a sequential or feed forward arrangement). Such networks may use feed forward or sequential models to learn the node/layer weights, for example by back propagation. But the architecture is generally fixed.

Neural Architecture Search ("NAS"), including gradient based NAS, can be useful for designing neural networks automatically and can serve as a replacement for hand-crafted networks for challenging tasks such as computer vision and other applications. Typically, at any given time, NAS searches for a separate network for each task.

BRIEF SUMMARY OF THE DISCLOSURE

To find a network architecture that is well suited for a given task (e.g., detecting pedestrians), the weights of the nodes as well as the weights of the edges of a search space are optimized. Due to the combinatorial nature of the search space of possible neural network architectures, NAS algorithms typically limit the search space by structuring it as a lattice. Such a lattice can represent all possible architectures that can be obtained by combining a restricted set of operations into a limited set of layers/nodes. Optimization over the search space is either done combinatorically via random search (including variants like Genetic Algorithms) or by gradient-based optimization over a smooth surrogate.

Thus, finding an architecture that is optimal for a given task using NAS can be time consuming and inefficient. In a system that must handle multiple tasks, such as detecting and/or predicting various objects such as pedestrians, bicyclists, cars, trucks, etc., as well as semantic segmentation and other tasks associated with autonomous, semi-autonomous, assisted or other driving applications, or other machine learning applications, including image processing and facial recognition, typical NAS methods treat each task separately. Thus, such systems typically use a different pretrained network for each task. Certain NAS methods may have to search for each of these networks repeatedly and independently. Autonomous, semi-autonomous, assisted, and other driving applications, as well as other types of machine learning applications, may involve a dozen or more tasks and hence networks. Systems supporting such applications, such as vehicle control systems, may have limited resources and thus may be overwhelmed by all the individual models/networks. Moreover, certain NAS algorithms do not necessarily find multiple pre-trained networks. Further, certain network compression and distillation techniques are only applied to one network and do not have architecture search capabilities.

In view of the above shortcomings, there is a need for a system that reduces the number of networks involved in NAS while supporting multiple tasks.

According to various embodiments of the disclosed technology a computer system finds from scratch deep neural network architectures that, once trained, can optimize a single objective for multiple tasks. Moreover, one or more embodiments of the present disclosure involve a Neural Architecture Fusion ("NAF") in which a machine learning system learns how to combine multiple pre-trained networks, possibly for multiple tasks, by fusing their architectures and weights into one single network for better computational efficiency (e.g., by sharing computations) and higher accuracy (e.g., by sharing representations).

One or more embodiments of the disclosure include a computer implemented method. The method may include obtaining multiple trained networks. Each of the trained networks may be associated with a respective task and have a respective architecture. The method may further include generating a directed acyclic graph that represents at least a partial union of the architectures of the trained networks. The directed acyclic graph may be or include a lattice. In one or more embodiments, the method includes using weights of the trained networks to initialize nodes of the directed acyclic graph. In addition, the method may include defining a joint objective for the directed acyclic graph that combines a performance term and a distillation term. The performance term may be one or more of latency, accuracy, and a number of parameters. Defining the joint objective may include regressing outputs of the trained networks. The method may also include optimizing the joint objective over the directed acyclic graph. Optimizing the joint objective may include using a differentiable architecture search.

One or more embodiments of the disclosure include a non-transitory computer-readable medium having executable instructions stored thereon that, when executed by a processor, perform certain operations. One such operation is generating a directed acyclic graph that represents at least a partial union of multiple trained networks. The directed acyclic graph may be or include a search space lattice that includes nodes connected by edges. Each of the trained networks may be associated with a respective task and have a respective architecture. Another such operation is using weights of the trained networks to initialize nodes of the directed acyclic graph. Another such operation is defining a joint objective for the directed acyclic graph. The joint objective may represent a combination of objectives for each of the trained networks. Another such operation is optimizing the joint objective over the directed acyclic graph. Optimizing the joint objective may include using a differentiable architecture search. Another such operation is selecting paths in the search space lattice using edge weights of the search space lattice. Selecting the paths in the search space lattice may include using a Viterbi algorithm.

One or more embodiments of the present disclosure include a non-transitory computer-readable medium having executable instructions stored thereon that, when executed by a processor, perform certain operations. One such operation is decoding one or more architectures by selecting paths in a directed acyclic graph network that includes nodes and edges using edge weights of the directed acyclic graph. The directed acyclic graph can represent at least a partial union of multiple trained networks. The directed acyclic graph network may be or include a lattice search space. Each of the trained networks may be associated with a respective task and have a respective architecture. A joint objective may have been optimized over the directed acyclic graph. The joint objective may be defined for the directed acyclic graph and represent a combination of objectives for each of the trained networks. The joint objective may have been optimized using a differentiable architecture search. The joint objective may be defined using regression.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the present disclosure can provide systems and methods that quickly and efficiently find new neural network architectures for multiple tasks, for example, tasks used in connection with image processing systems such as those used for autonomous, semi-autonomous, assisted, or other driving systems, as well as other tasks and applications, including any machine learning application. In particular, one or more embodiments of the disclosed technology include a computer system that uses neural architecture fusion to learn how to combine multiple separate pre-trained networks by fusing their architectures into a single network for better computational efficiency, for example by sharing computations, and higher accuracy, for example by sharing representations. For example, one or more embodiments of the present disclosure involve a machine learning system finding from scratch deep neural network architectures that, once trained, optimize a single objective for multiple tasks.

Figure 1:
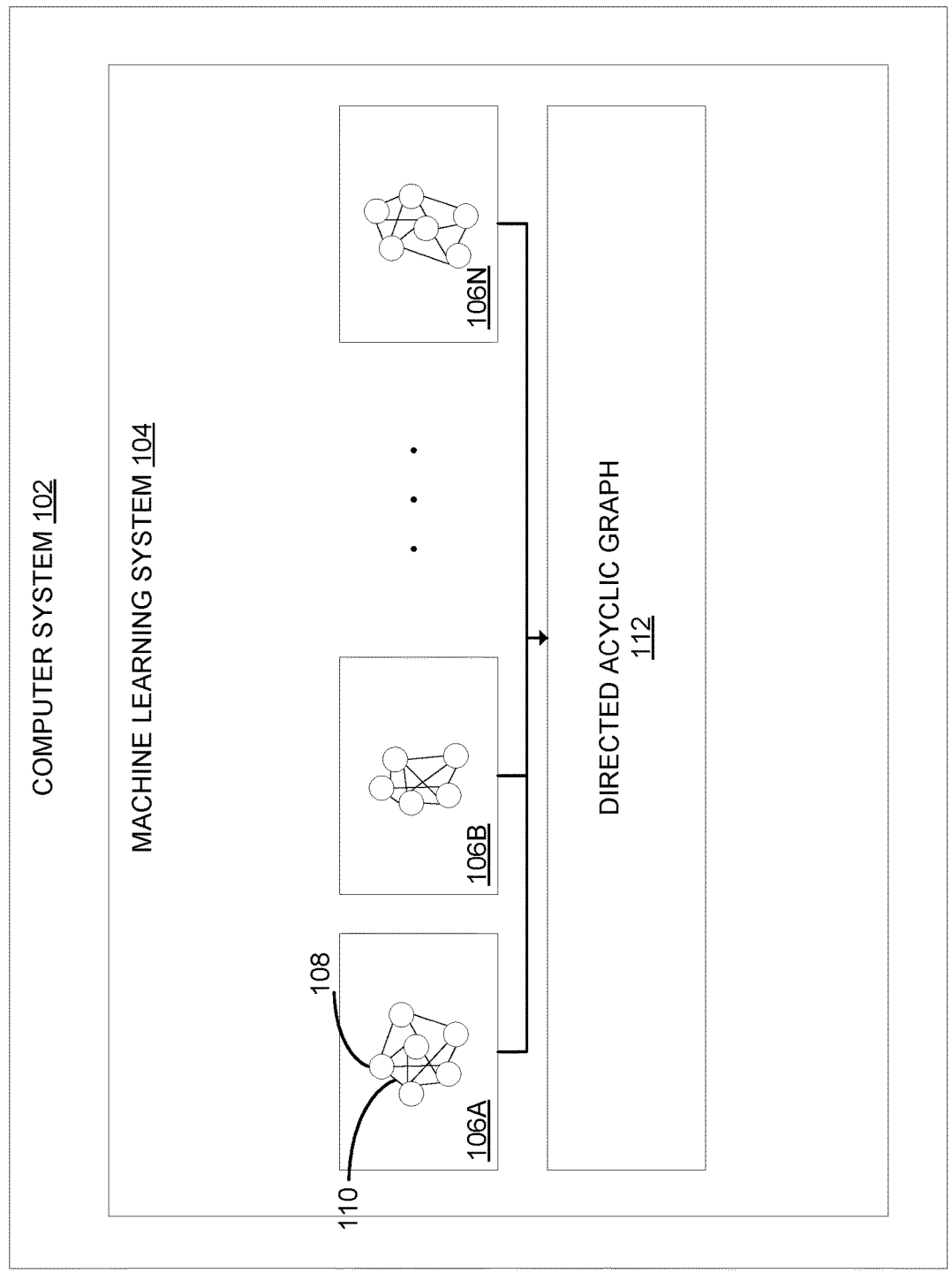
FIG. 1 is an example representation of a computer system that may be used to implement one or more embodiments of the systems and methods disclosed herein.

FIG. 1 depicts example computer system 102 that may be used to implement aspects of the present disclosure. Computer system 102 may include machine learning system 104 that may in turn be used to generate directed acyclic graph 112 using multiple pre-trained networks 106A106N. Each pre-trained network 106A-106N may be associated with a respective task and have a respective architecture that has been optimized for that task. Each network 106A-106N may include nodes 108 and edges 110 connecting multiple nodes 108 to form paths associated with an associated task. Such tasks may include, for example, pedestrian detection, bicyclist detection, vehicle detection, and other tasks that may be used for automated, semi-automated, assisted, and other driving applications, as well as other tasks applicable more generally to image processing and detection and/or machine learning generally.

DAG 112 may similarly include nodes and edges and may represent at least a partial union of the architectures of multiple networks 106A-106N. In one or more embodiments, DAG 112 may be structured as a lattice and may be a search space lattice having nodes connected by edges. It should be appreciated that a restricted set of DAGs can be represented itself by DAGs, which may be referred to as supernets. Two chains of a DAG running in parallel can also be referred to as a DAG, and connecting two nodes can form a DAG. The superset of all possible architectures can also be referred to as a DAG.

Machine learning system 104 may use weights of multiple networks 106A-106N to initialize nodes of DAG 112. Machine learning system 104 can be used to define a joint objective for DAG 112, where the joint objective combines a performance term and a distillation term. The joint objective may represent a weighted combination of respective objectives for multiple networks 106A-106N. The joint objective may be defined by, among other things, regressing the outputs of multiple networks 106A-106N.

The performance term may be based on any one of latency, accuracy, and a number of parameters, or some combination of the foregoing. Distillation terms may represent extracted upper bounds from the network 106A-106N associated with a particular task (e.g., the best available model compared with the fused model of DAG 112). For example, a more complicated, fused model such as DAG 112 may not learn as well overall, but may have efficiency and accuracy gains. Distillation is a technique for training such a sophisticated model and injecting information from the separate underlying networks 106A-106N into the model of DAG 112 at each feature level (e.g., not just input and output). Distillation thus assists with training the merged model (e.g., DAG 112).

In addition, machine learning system 104 can be used to optimize the joint objective over DAG 112. The joint objective may be optimized using, for example, a differentiable architecture search or another type of suitable architecture search.

Machine learning system 104 may be used to decode one or more architectures by selecting paths in DAG 112 using edge weights of DAG 112, or the edge weights of the lattice in that particular example implementation. The paths may be selected using a Viterbi algorithm or another suitable algorithm used for NAS.

As mentioned, machine learning system 104 may be used to combine the architectures for different tasks, for example based on commonalities between the architectures associated with the tasks. For example, network 106A may have been trained using machine learning system 104 in connection with a NAS process for a pedestrian detection task. Thus, in this example network 106A may be for pedestrian detection. And network 106B may have been trained in connection with a NAS process for bicyclist detection. Thus, in this example network 106B may be for bicyclist detection. Machine learning system 104 may be used to analyze commonalities between the pedestrian detection and bicyclist detection networks 106A and 106B, where such commonalities may imply architecture compatibility. For example, both tasks may involve to some extent detecting a human form. Machine learning system 104 may then use aspects of the respective architectures associated with pedestrian detection and bicyclist detection and fuse those architectures and the associated weights together to generate DAG 112 that represents at least a partial union of networks 106A and 106B.

In this manner, machine learning system 104 may generate a single network for multiple tasks. By virtue of operating with a single, fused architecture and network, computational efficiency and accuracy can be increased because computations and representations can be shared among the different tasks. It should be appreciated that the networks 106A-106B for multiple different tasks can be fused in a manner that is based on the nature of the underlying networks 106A-106N and various factors as described herein.

In one or more embodiments of the present disclosure, DAG 112 may be formed as part of a training process, which may be carried out using machine learning system 104 of computer system 102. As described herein, computer system 102 may reside in a back end system relative to a vehicle. By way of example, once optimization has converged for all networks 106A-106N that are desired, networks 106A-106N can be used to generate DAG 112. Once optimized, DAG 112 can then be uploaded to the computer system of a vehicle (e.g., machine learning system 402 with reference to FIG. 4), for example in the form of trained machine learning models 430, and used for autonomous, semi-autonomous, assisted, or other driving systems. It should also be appreciated upon studying the present disclosure that in one or more embodiments all or part of computer system 102 and/or machine learning system 104 and their functionalities described herein may reside on board a vehicle. For example, all or part of computer system 102 and/or machine learning system 104 may reside within machine learning system 402 and their functionalities may be performed thereby.

Optimization may be considered converged when a given objective stops improving, or after a fixed number of iterations, or for example when a local maximum or optimum is reached. Machine learning system 104 may also consider a threshold difference between two or several iterations of an optimization process, where the process is complete when the threshold difference is met. In other examples, the system may constrain the reference and current architectures to be sufficiently close before the process is considered complete. By way of illustration, it may not be desirable for edge weights to change beyond a certain level where two tasks are known to be similar. Or, certain parts of the architecture may be allowed to be more different than others where it is expected that the differences will be greater, based on commonalities between the tasks. Thus, in one or more embodiments, optimization may be constrained based on expected similarities among multiple networks 106A-106N.

Machine learning system 104 can include circuitry to control various aspects of the machine learning operations described herein. For example, machine learning system 104 may include a microcomputer that includes a one or more processing units (e.g., microprocessors), memory storage (e.g., RAM, ROM, etc.), and I/O devices (e.g., a data interface). The processing units of machine learning system 102 execute instructions stored in memory to control one or more systems or subsystems in machine learning system 104 and/or computer system 102. Upon studying the present disclosure, one of skill in the art will appreciate that features described with respect to machine learning system 402 with reference to FIG. 4 may be used in connection with machine learning system 104.

Figure 6:
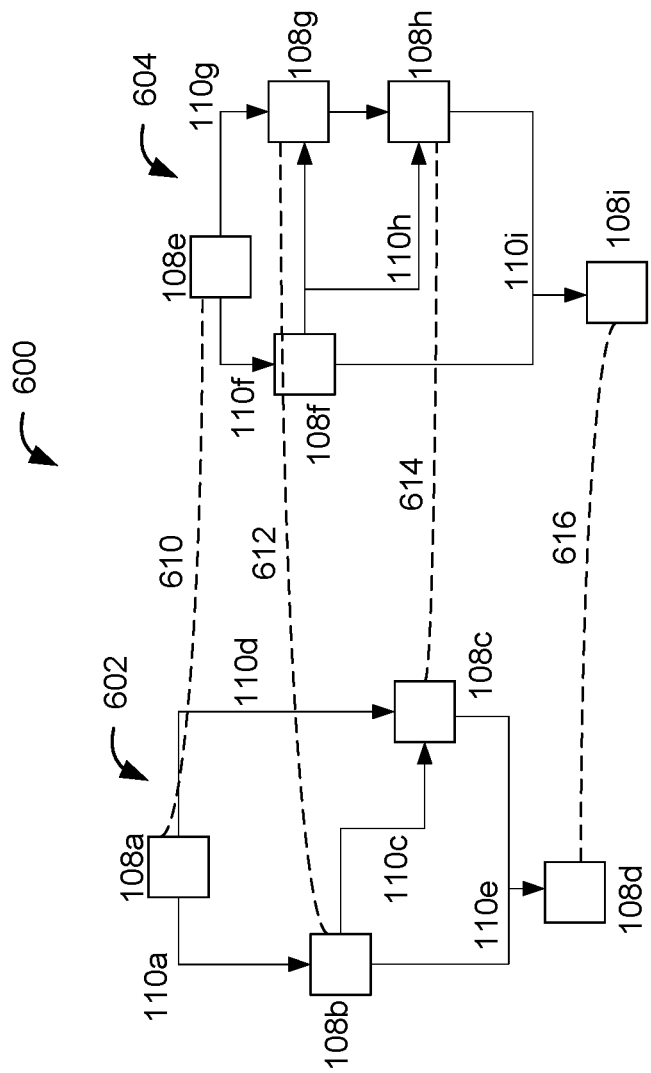
FIG. 6 is an example representation of networks that may be used in connection with one or more embodiments of the present disclosure.

FIG. 6 provides an example of network 600 (e.g., DAG 112 referencing FIG. 1) formed from creating at least a partial union of two underlying networks 602 and 604, according to one or more embodiments of the present disclosure. Network 602 may include one or more nodes 108*a-d* connected by edges 110*a-e* and may be associated with a first task. Network 602 may be one of networks 106A-N referencing FIG. 1. Network 604 may include one or more nodes 108*e-i* connected by edges 110*f-i* and may be associated with a second task. Network 604 may be one of networks 106A-N.

Within network 602 and network 604, respectively, the nodes and edges may form a neural architecture searching path and may, for example, include different possible convolution modules. When networks 602 and 604 are fused, dashed lines 610, 612, 614, and 616 can represent the formation of a binary search path in which layers or nodes are skipped, indicating the merging of the respective feature maps of networks 602 and 604. In this manner, at least a partial union between networks 602 and 604 can be formed according to one or more embodiments.

Figure 2:
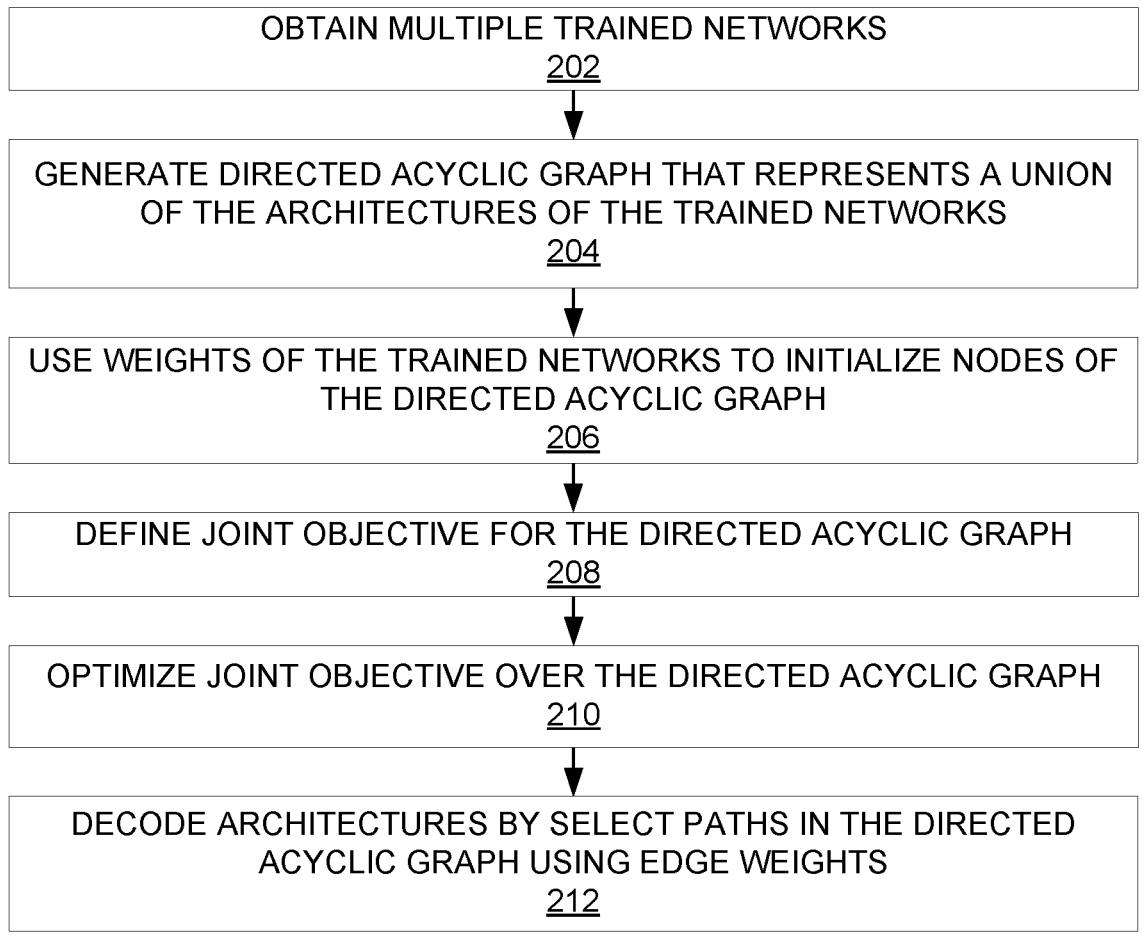
FIG. 2 illustrates example operations of a computer implemented method according to one or more embodiments of the present disclosure.

FIG. 2 provides operations that may be carried out in connection with computer implemented method 200, according to one or more embodiments of the present disclosure. At operation 202, computer implemented method 200 may involve obtaining multiple trained networks 106A-106N. Each trained network 106A-106N may be associated with a respective task and have a respective architecture. In one or more embodiments, machine learning system 104 may train networks 106A-106N itself. In one or more embodiments, machine learning system 104 may obtain trained networks 106A-106N from an external source such as a file provided to computer system 102. Operation 202 may be carried out using machine learning system 104, possibly in conjunction with other elements such as, for example, computer system 102.

At operation 204, method 200 may involve generating DAG 112 that represents at least a partial union of the architectures of multiple trained networks 106A-106N. As such, machine learning system 104 may generate DAG 112 as a fusion of multiple different networks 106A-106N for different tasks that may have commonalities. DAG 112 may include nodes, which may represent operator choices, edges (e.g., connectivity), and a maximum depth. DAG 112 may be formed from multiple parallel branches of nodes, or any other configuration formed from chains of nodes where the chains are directly or indirectly connected to each other. The operator choices may include, for example, a convolutional filter, a fully connected layer, or a Boolean operator, etc. The maximum depth may be the maximum number of nodes or layers present in DAG 112. Operation 204 may be carried out using machine learning system 104.

At operation 206, computer implemented method 200 may involve using weights of trained networks 106A-106N to initialize nodes of DAG 112. Because DAG 112 may be formed using multiple underlying pre-trained networks 106A-106N, the node and edge weights of those networks can represent a good starting point for initializing DAG 112 that can lead to faster convergence. In connection with operation 206, where no paths have been previously trained, the weights can be randomly initialized or set to zero. Operation 206 may be carried out using machine learning system 104.

At operation 208, computer implemented method 200 may involve defining a joint objective for DAG 112 that combines a performance term and a distillation term. The joint objective, in one or more embodiments, may be a weighted combination of objectives associated with underlying networks 106A-106N. Defining the joint objective may involve making a tradeoff of the objectives associated with the underlying networks 106A-106N. For example, a tradeoff between accuracy and latency/speed is typically made depending on the particular task involved. To illustrate, detection related tasks may not need to be particularly accurate but should be faster, whereas semantic segmentation may require higher accuracy while accepting longer latency. Tasks having commonalities may be merged such that compatible tradeoffs can be made.

Defining the joint objective may involve regressing outputs of one or more networks 106A-106N. Examples of objectives may include one or more of a validation error, latency, other objectives, or a combination thereof. Other examples of objectives include the number of times a pedestrian may be confused with a non-pedestrian, or the like. Operation 208 may be carried out using machine learning system 104.

At operation 210, computer implemented method 200 may involve optimizing the joint objective over DAG 112. Optimization may include predicting node and edge weights over DAG 112. Predicting edge weights over DAG 112 may include connecting nodes of DAG 112 into paths corresponding to a deep net architecture. By leveraging commonalities between multiple different networks 106A-106N for different tasks, each having their own objectives, to optimize a single, joint objective, computational efficiency and accuracy can be increased. Operation 210 may be carried out using machine learning system 104.

At operation 212, computer implemented method 200 may optionally involve decoding one or more architectures by selecting paths in DAG 112, or in a search space lattice, as the case may be, using edge weights of DAG 112 or the search space lattice. Operation 210 may be carried out once DAG 112 or the search space lattice has been optimized using machine learning system 104 and, for example, the resulting trained network has been uploaded to a vehicle's computer system in the form of trained machine learning models 430 (referencing FIG. 4). At this stage, training is complete and the edge weights of DAG 112 have been optimized, and all nodes have been assigned weights.

Selecting the paths in DAG 112 or the search space lattice may include removing edges that have low edge weight relative to other edges. For example, any edge with a weight below a threshold may be pruned from DAG 112 or the lattice search space and any nodes no longer connected within DAG 112 or the lattice search space by edges may likewise be pruned. Quantiles may be used to determine relatively low edge weights. For example, the bottom 10% of the edge weight values may be pruned. In one or more embodiments, decoding the one or more architectures may be done using a Viterbi algorithm or similar or other algorithms suitable for machine learning. Operation 212 may, for example, be carried out using machine learning system 402 within the computer system of a vehicle, for example, in connection with autonomous, semi-autonomous, assisted, or other driving applications. In one or more embodiments, operation 212 may be carried out using computer system 102 and/or machine learning system 104.

Before operation 212, method 200 may optionally involve outputting information that can be used to decode one or more architectures by selecting paths in DAG 112 or the search space lattice. For example, machine learning system 104 and/or computer system 102 may output information that may be used by machine learning system 402 within a vehicle's computer system to decode one or more architectures (e.g., from trained machine learning models 430 with reference to FIG. 4), as described herein. This information may take the form of one or more executable files that include state machine language model that may be deployed to a vehicle.

Figure 3:
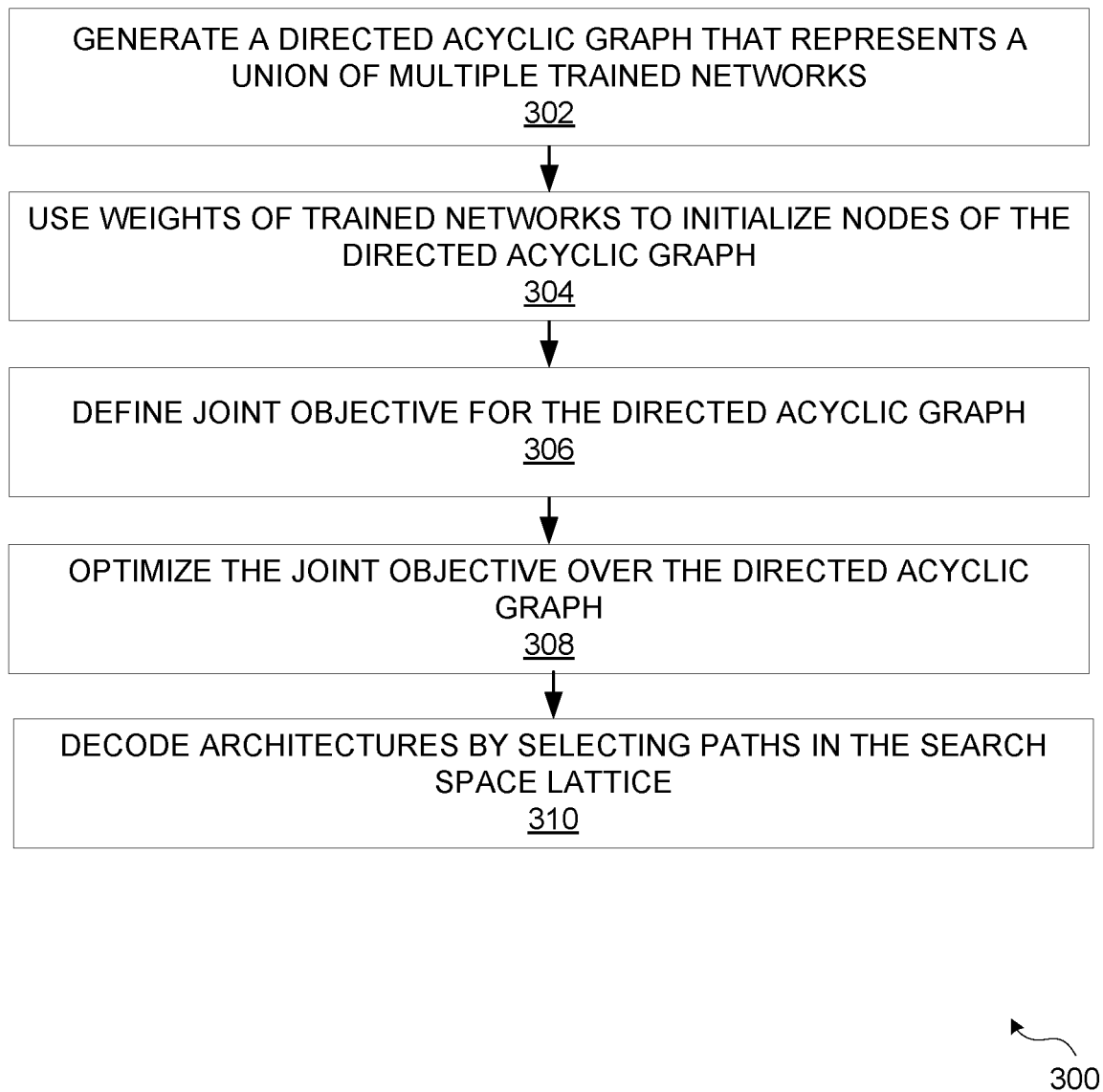
FIG. 3 illustrates example operations of a computer implemented method according to one or more embodiments of the present disclosure.

FIG. 3 provides operations that may be carried out in connection with computer implemented method 300, according to one or more embodiments of the present disclosure. At operation 302, computer implemented method 300 may involve generating DAG 112 that represents at least a partial union of multiple trained networks 106A-106N. Operation 302 may be carried out using machine learning system 104.

At operation 304, computer implemented method 300 may optionally involve using weights of multiple trained networks 106A-106N to initialize nodes of DAG 112. Operation 304 may be carried out using machine learning system 104.

At operation 306, computer implemented method 300 may involve defining a joint objective for DAG 112 where the joint objective represents a combination of objectives for each of multiple trained networks 106A-106N. Operation 306 may be carried out using machine learning system 104.

At operation 308, computer implemented method 300 may involve optimizing the joint objective over DAG 112. Optimizing the joint objective according to operation 308 may involve using a differentiable architecture search or another type of architecture search suitable for NAS. Operation 308 may be carried out by machine learning system 104.

At operation 310, computer implemented method 300 may optionally involve decoding one or more architectures by selecting paths in DAG 112 or a search space lattice, as the case may be. Operation 310 may involve using edge weights of DAG 112 or the search space lattice 112. Operation 310 may involve selecting the paths using a Viterbi algorithm or another suitable algorithm. Operation 310 may, for example, be carried out using machine learning system 402 within the computer system of a vehicle, for example, in connection with autonomous, semi-autonomous, assisted, or other driving applications.

Figure 4:
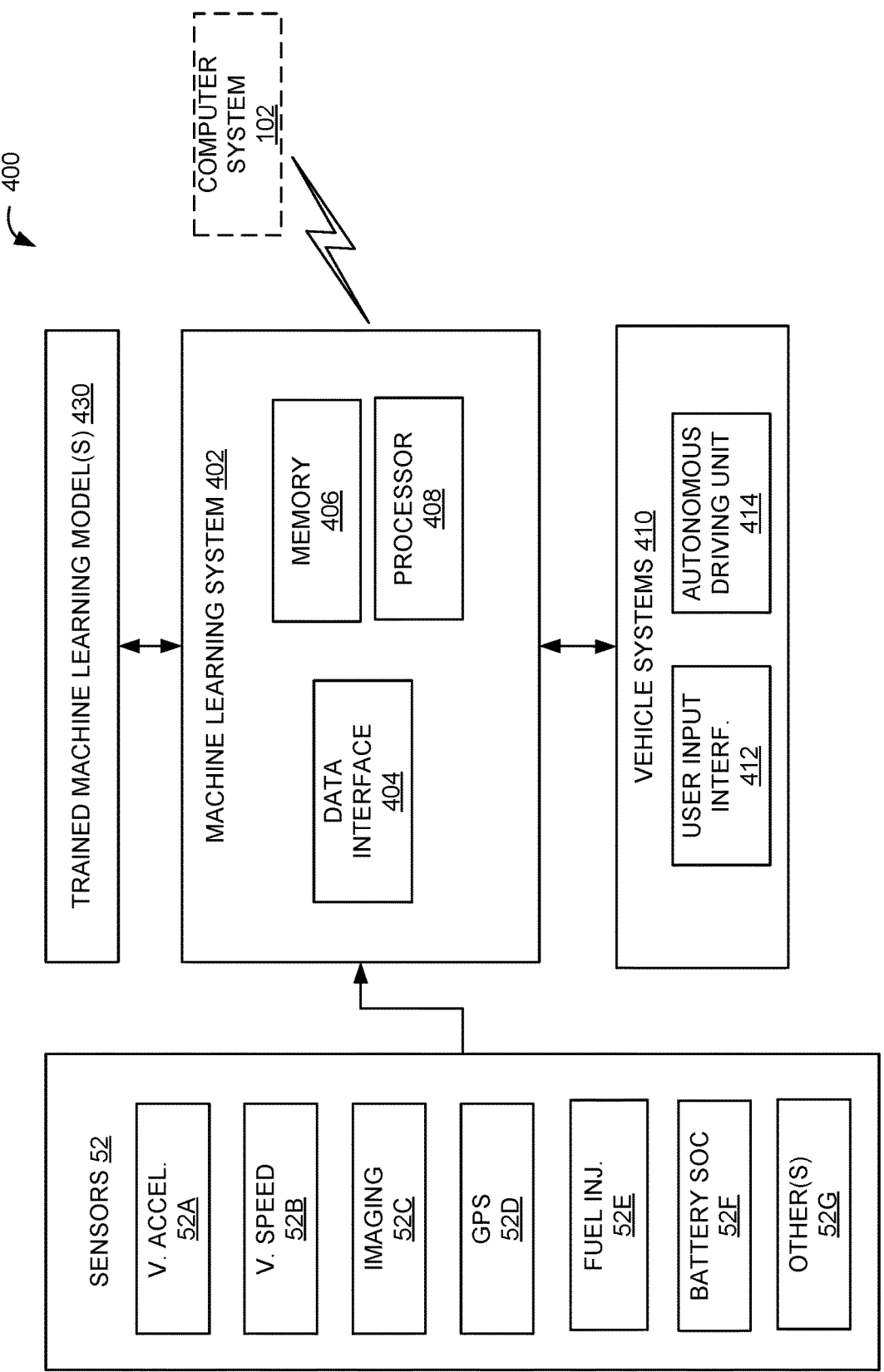
FIG. 4 illustrates an example block diagram of a vehicle that may use a machine learning system in accordance with one or more embodiments of the systems and methods described herein.

FIG. 4 provides a diagram of example system 400 that depicts various systems and elements that may be present on a vehicle with or in which aspects of the present disclosure may be implemented. For example, system 400 may include one or more sensors 52, machine learning system 402, and/or vehicle systems 410 (which may include user input interface 412 and autonomous driving unit 414). As shown in FIG. 4 and described herein, machine learning system 402 may be coupled to computer system 102.

As shown in FIG. 1, computer system 102 may include machine learning system 104. Machine learning system 104 may be used to implement various operations of computer implemented methods 200 and 300, as described herein. For example, machine learning system 104 of computer system 102 may be used to obtain multiple trained networks 106A-106N (e.g., at operation 202), generate DAG 112 that represents at least a partial union of the architectures of multiple trained networks 106A-106N (e.g., at operation 204), use weights of multiple trained networks 106A-106N to initialize nodes of DAG 112 (e.g., at operation 206), define a joint objective for DAG 112 (e.g., at operation 208), and optimize the joint objective over DAG 112 (e.g., at operation 210). Or, for example, machine learning system 104 of computer system 102 may be used to generate DAG 112 that represents at least a partial union of multiple trained networks 106A-106N (e.g., at operation 302), use weights of multiple trained networks 106A-106N to initialize nodes of DAG 112 (e.g., at operation 304), define a joint objective over DAG 112 (e.g., at operation 306), and optimize the joint objective over DAG 112 (e.g., at operation 308). Machine learning system 104 and/or computer system 102 may also be adapted to output one or more executable files in which a state machine model for DAG 112 and optionally for networks 106A-106B may be stored.

Turning again to FIG. 4, the information output by machine learning system 104 of computer system 102 may be conveyed to machine learning system 402, which may be on board a vehicle for example. For example, the information may be uploaded as an executable file to the vehicle as trained machine learning models 430. Machine learning system 402 may then use the information to decode one or more architectures (e.g., deep net architectures) by selecting paths in DAG 112 (e.g., at operations 212 and 310). Additionally, for example, machine learning system 402 may obtain information from sensors 52, such as imaging information, and process the information through trained learning models 430 to assist in controlling vehicle systems 410, including autonomous driving unit 414. Here it should be noted that in one or more embodiments autonomous driving unit 414 may be a semi-autonomous, assisted driving, or other vehicle control unit.

By way of illustration, the imaging information captured using imaging sensor 52C may include an obstacle to be detected. Machine learning system 402 may use trained models 430 to determine whether the obstacle is a pedestrian or a bicyclist and provide information to vehicle systems 410 that enables autonomous driving unit 414 to control the vehicle accordingly. According to one or more embodiments, DAG 112 that may represent at least a partial union between networks 106A-106N associated with the tasks of pedestrian detection and bicyclist detection may be used to determine whether the obstacle is a pedestrian or bicyclist.

As alluded to above, one or more sensors 52 may provide signals that indicate vehicle operating conditions or characteristics, or signals that can be used to derive vehicle operating conditions or characteristics. These may include, but are not limited to vehicle acceleration 52A, vehicle speed 52B, imaging 52C, GPS 52D, fuel injection 52E, battery 52F, and other sensors 52G. Accordingly, system 400 can include a plurality of sensors 52 that can be used to detect various conditions internal or external to a vehicle and provide sensed conditions to machine learning system 402 (which may be implemented as one or a plurality of individual control circuits) or vehicle systems 410.

In one or more embodiments, one or more of the sensors 52 may include their own processing capability to compute the results for additional information that can be provided to other elements of system 400, such as machine learning system 402 and/or vehicle systems 410. In one or more embodiments, one or more of sensors 52 may be data-gathering-only sensors that provide only raw data to other blocks within system 400. In one or more embodiments, hybrid sensors may be included that provide a combination of raw data and processed data. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles (including, for example, pedestrians, bicyclists, other vehicles, etc.), and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Sensors 52 can provide information to machine learning system 402 via data interface 404. For example, imaging sensor 52C may provide images or video to machine learning system 302 via data interface 304. Machine learning system 402 can process the images or video and communicate with vehicle systems 410 for purposes of autonomous, semi-autonomous, assisted, or other types of driving using autonomous driving unit 414, or for other forms of vehicle control.

Machine learning system 402 can include circuitry to control various aspects of the machine learning operations described herein. For example, machine learning system 402 may include a microcomputer that includes a one or more processing units 408 (e.g., microprocessors), memory storage 406 (e.g., RAM, ROM, etc.), and I/O devices (e.g., data interface 404). The processing units of machine learning system 402 execute instructions stored in memory 406 to control one or more systems or subsystems in system 400, including vehicle systems 410 and in particular autonomous driving unit 414.

Processor 408 can include a GPU, CPU, microprocessor, or any other suitable processing system. Memory 406 may include one or more various forms of memory or data storage (e.g., flash, RAM, etc.) that may be used to store trained learning machine learning models 430 that may be uploaded from remote computer system 102 via any type of communication medium, instructions and variables for processor 308 as well as any other suitable information. For example, computer system 102 can be used, possibly in conjunction with machine learning system 104 shown in FIG. 1, to perform various operations of methods 200 and 300 and output information that may be used to decode architectures by selecting paths in DAG 112. This information may be communicated to machine learning system 402 on board a vehicle via any form of wired or wireless communication. By way of example, the information may be uploaded as an executable file.

Memory 406 can be made up of one or more modules of one or more different types of memory, and may be configured to store data and other information as well as operational instructions that may be used by the processor 408 to perform machine learning functions within the vehicle.

Although the example of FIG. 4 is illustrated using processor and memory circuitry, as described below with reference to circuits disclosed herein, machine learning system can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up machine learning system 302.

As alluded to above, machine learning system 402 may include one or more communication circuits, including either or both a wireless transceiver circuit with an associated antenna (not illustrated) and/or a wired I/O interface with an associated hardwired data port (not illustrated) to couple to sensors 52 and/or computer system 102. The communications circuit used to connect machine learning system 402 with computer system 102 may be part of data interface 404 or may be separate. Communications between machine learning system 402 and sensors 52 or computer system 102 can include either or both wired and wireless communications circuits to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

Data interface 404 can include a transmitter and a receiver (not shown) for hardwired communications with other devices. For example, data interface 404 can provide a hardwired interface to other components, including sensors 52, vehicle systems 410, and/or computer system 102. Data interface 404 can communicate with other devices using Ethernet or any of a number of other wired communication protocols whether standardized, proprietary, open, point-to-point, networked or otherwise.

It should also be appreciated that in one or more embodiments, machine learning system 402 may be omitted. In such embodiments, sensors 52 may be coupled to vehicle system 410 and trained machine learning models 430 may be uploaded to memory accessible to vehicle systems 410 and used by autonomous driving unit 414. It will be appreciated in such embodiments that vehicle systems 410 may include a data interface, communications circuits, memory, and a processor.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Figure 5:
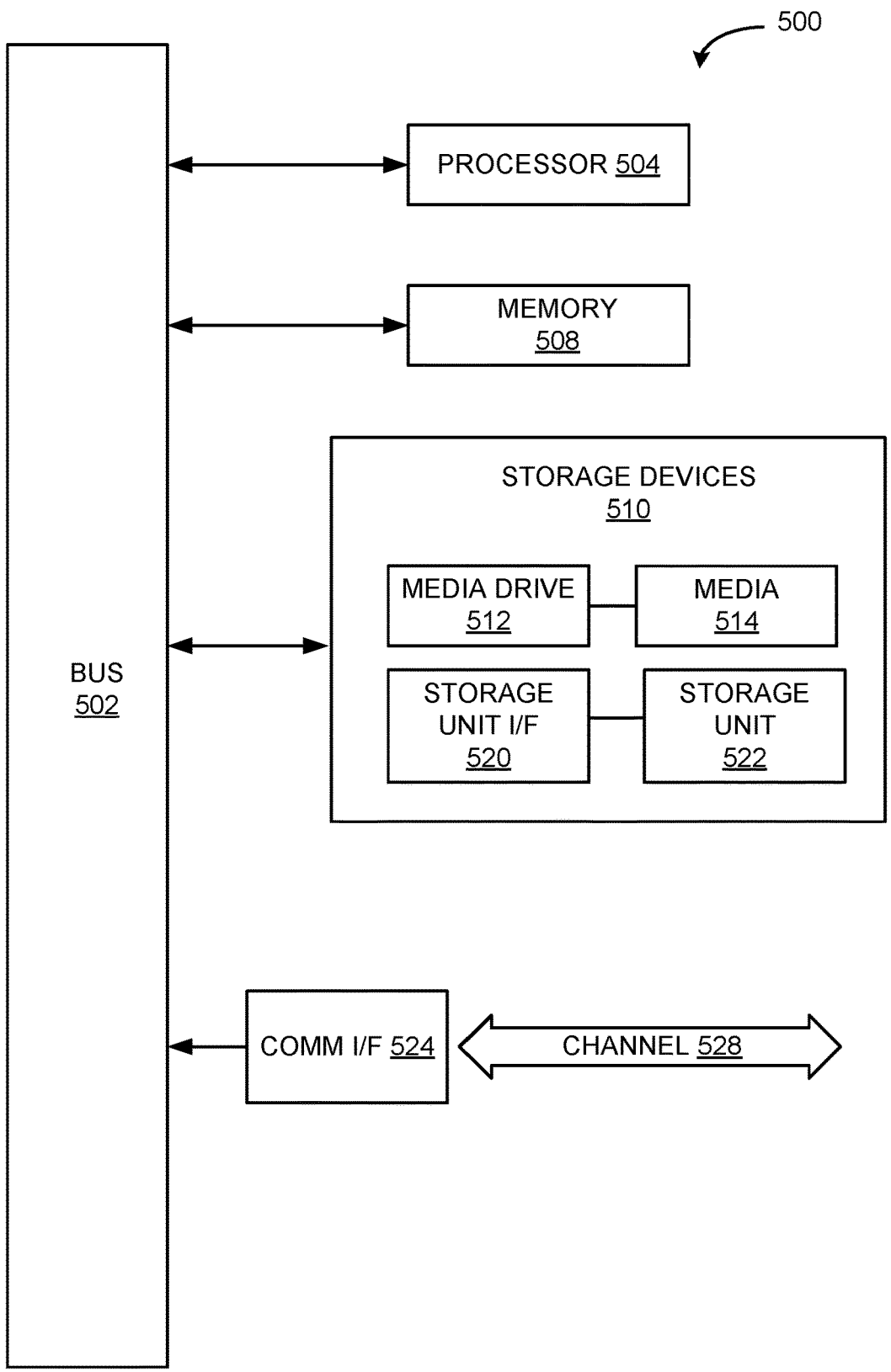
FIG. 5 is an example computing component that may be used to implement various features of one or more embodiments described in the present disclosure.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDAs, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up computer system 102, machine learning system 402, and/or vehicle systems 410. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage devices 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions or operations of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method, comprising:
   obtaining multiple trained networks, wherein each of the trained networks is associated with a respective task and has a respective architecture;
   generating a directed acyclic graph that represents at least a partial union of the architectures of the trained networks;
   defining a joint objective for the directed acyclic graph that combines a performance term and a distillation term; and
   optimizing the joint objective over the directed acyclic graph.

2. The computer implemented method of claim 1, further comprising using weights of the trained networks to initialize nodes of the directed acyclic graph.

3. The computer implemented method of claim 1, wherein the performance term is selected from the group consisting of latency, accuracy, and a number of parameters.

4. The computer implemented method of claim 1, wherein defining the joint objective comprises regressing outputs of the trained networks.

5. The computer implemented method of claim 1, wherein optimizing the joint objective comprises using a differentiable architecture search.

6. The computer implemented method of claim 1, wherein the directed acyclic graph comprises a lattice.

7. A non-transitory computer-readable medium having executable instructions stored thereon that, when executed by a processor, perform the operations of:
generating a directed acyclic graph that represents at least a partial union of multiple trained networks, wherein each of the trained networks is associated with a respective task and has a respective architecture;
defining a joint objective for the directed acyclic graph, wherein the joint objective represents a combination of objectives for each of the trained networks; and
optimizing the joint objective over the directed acyclic graph.

8. The non-transitory computer-readable medium of claim 7, wherein the instructions, when executed by the processor, further perform the function of using weights of the trained networks to initialize nodes of the directed acyclic graph.

9. The non-transitory computer-readable medium of claim 7, wherein optimizing the joint objective comprises using a differentiable architecture search.

10. The non-transitory computer-readable medium of claim 7, wherein the directed acyclic graph comprises a search space lattice comprising nodes connected by edges.

11. The non-transitory computer-readable medium of claim 10, wherein the instructions, when executed by the processor, further perform the function of selecting paths in the search space lattice using edge weights of the search space lattice.

12. The non-transitory computer-readable medium of claim 11, wherein selecting the paths in the search space lattice comprises using a Viterbi algorithm.

13. A non-transitory computer-readable medium having executable instructions stored thereon that, when executed by a processor, perform the operations of:
decoding one or more architectures by selecting paths in a directed acyclic graph network comprising nodes and edges using edge weights of the directed acyclic graph,
wherein the directed acyclic graph represents at least a partial union of multiple trained networks, wherein each of the trained networks is associated with a respective task and has a respective architecture,
wherein a joint objective has been optimized over the directed acyclic graph, wherein the joint objective is defined for the directed acyclic graph and represents a combination of objectives for each of the trained networks.

14. The non-transitory computer-readable medium of claim 13, wherein the directed acyclic graph network is a lattice search space.

15. The non-transitory computer-readable medium of claim 13, wherein the joint objective has been optimized using a differentiable architecture search.

16. The non-transitory computer-readable medium of claim 13, wherein the joint objective is defined using regression.

* * * * *